United States Patent [19]
Jernigan

[11] 4,105,953
[45] Aug. 8, 1978

[54] CHIRPED ACOUSTO-OPTIC Q SWITCH

[75] Inventor: James L. Jernigan, Inyokern, Calif.

[73] Assignee: The United States of America as represented by the Secretary of the Navy, Washington, D.C.

[21] Appl. No.: 761,831

[22] Filed: Jan. 24, 1977

[51] Int. Cl.² ............................................. H01S 3/11
[52] U.S. Cl. .............................. 331/94.5 Q; 350/358
[58] Field of Search ........................ 350/161 W, 358; 331/94.5 Q, 94.5 M

[56] References Cited
U.S. PATENT DOCUMENTS

| | | | |
|---|---|---|---|
| 3,297,876 | 1/1967 | DeMaria | 350/161 W |
| 3,483,387 | 12/1969 | Davis, Jr. | 350/161 W |

OTHER PUBLICATIONS

Scott et al., Fast Acousto-Optic Lens Q Switch, J. Appl. Phys., vol. 46, No. 8, (Aug. 1975), pp. 3483-3488.

Primary Examiner—William L. Sikes
Attorney, Agent, or Firm—R. S. Sciascia; Roy Miller; Kenneth G. Pritchard

[57] ABSTRACT

An improved acousto-optic laser Q-switch utilizing a chirped fm pulse in the acousto-optic cell to diffract and focus the input beam into a resonating high-Q mode. When the rf acoustic pulse is not wholly within the cell the beam is diverted to the output. A reflective surface is placed on the cell to yield only one output beam and to yield a retroreflective beam back into the cavity for a high Q condition whenever a correctly generated chirp acoustic wave is in the proper position within the cell.

5 Claims, 2 Drawing Figures

CHIRPED ACOUSTO-OPTIC Q SWITCH

CROSS REFERENCE TO RELATED APPLICATIONS

The present invention is related to subject matter described in "An Acousto-optic Q-Switch," by Marion Scott and James Jernigan, U.S. patent application Ser. No. 672,195, filed Mar. 31, 1976 and now abandoned and hereby incorporated in and made a part of the present specification.

BACKGROUND OF THE INVENTION

This invention relates to fast optical shuttering and more particularly to a Q-switch in a laser.

Q-switching permits the generation of intense bursts of radiation from a laser by creating a highly regenerative feedback of energy from the laser gain element wherein energy is stored in the system then suddenly released. To switch from the low-Q build-up condition to output requires a Q-switch. Rotating mirrors, prisms, Pockels cells and saturable absorbers have all been employed as Q-switches. Due to practical difficulties with these devices, electro-optic and acousto-optic Q-switches have been proposed.

Acousto-optic (A-O) Q-switches are preferable to electro-optic switches because they are mechanically more simple and reliable. Q-switches previously described use interrupted continuous wave forms to control the high-Q oscillatory state. However, propagation of the acoustic wave through the material is relatively slow, and acousto-optic cells have not been generally employed where fast-acting Q-switches are required for short radiation bursts.

The inventor has helped describe a "Fast Acousto-Optic Lens Q-Switch" in the *Journal of Applied Physics*, Vol. 46, No. 8, p 3483, August 1975. This Q-switch makes use of the fact that the angle of diffraction of light from an acousto-optic diffraction cell is proportional to the frequency of the acoustic pulse in the cell. A fast chirp frequency causes incident light to be focused to a line as it would be by a cylindrical lens. A pulse with linearly varying frequency is termed generally a "chirped" signal. If the leading edge of the pulse contains lower frequency components, the signal is more specifically denoted an "inverted chirp."

An acoustic chirp signal is thus used to focus laser energy and acts as an acousto-optic lens. The focused beam is reflected back to its source and the undiffracted beam is used as the laser output.

The focal point of the diffracted beam is swept across an aperture at a speed greater than the velocity of the acoustic waves through the A-O cell. This permits a short high-Q time and results in a short on time. The rate of sweep across the aperture is proportional to the focal length of the diffracted beam. The frequency of the chirp signal controls the angle of diffraction and changing the frequency causes the sweeping action. The on time of the laser is thus inversely proportional to the bandwidth of the chirp signal. Using present A-O materials, a 20 nanosecond high-Q condition with the attendant laser pulse can be realized.

A discussion of laser arrangements using this type of Q-switch may be found in the Scott et al. application and the *Journal* paper reference above. A disadvantage of these previous arrangements is that there are two output beams, one from each mirror of the cavity. A further disadvantage of the previous arrangement is the optical path length. Longer optical paths require greater aligning and focusing accuracy.

SUMMARY OF THE INVENTION

An acousto-optic Q-switch using a chirped acoustic pulse to focus the diffracted beam into a high-Q mode is provided with a highly reflective coating opposite the laser gain medium. This configuration permits a simple arrangement of the laser cavity because only one output beam is generated. A transducer is placed so that it generates a sound wave adjacent to the reflective coating.

One preferred embodiment uses a negative cylindrical lens to focus resonating light to and from the cell.

DESCRIPTION OF THE PREFERRED EMBODIMENT

Figure 1:
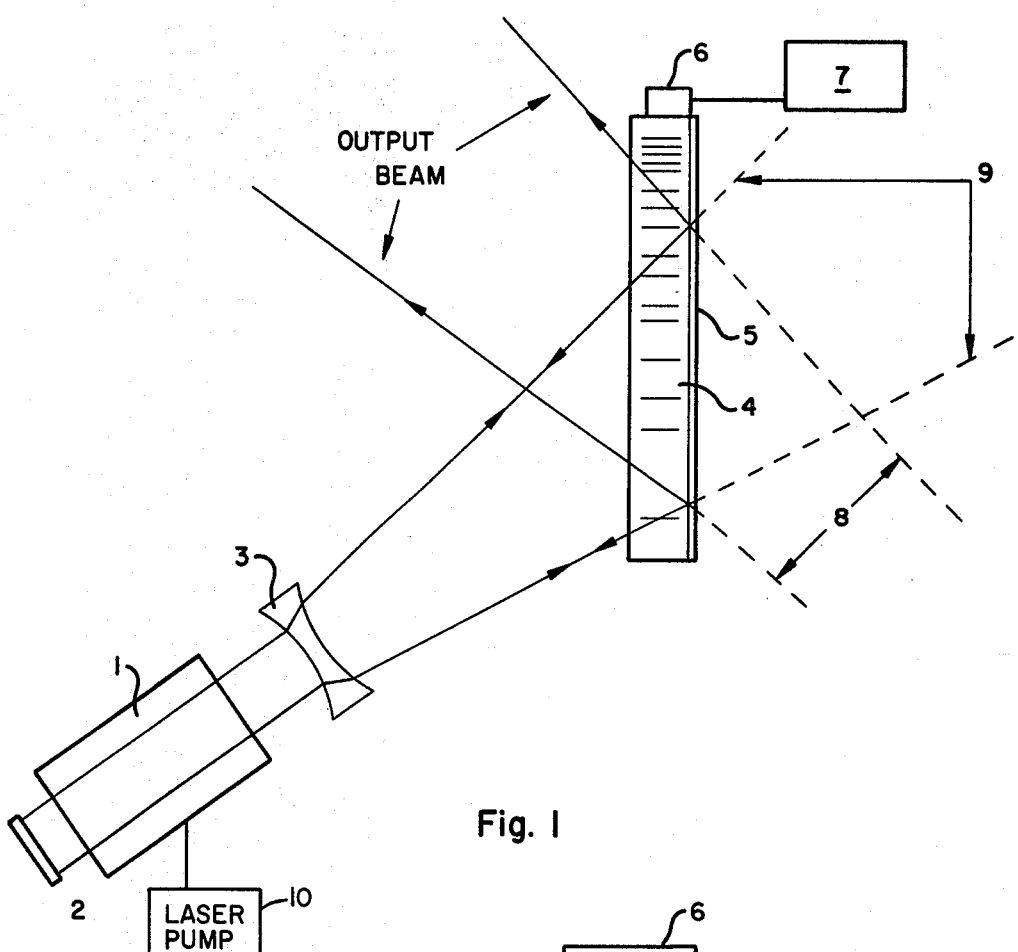
FIG. 1 is a diagrammatic representation of a laser arrangement using the Q-switch of the present invention.

Referring now to FIG. 1, a gain medium 1 is situated in a laser cavity defined on one end by a 100% plane reflective surface or back mirror 2. The gain medium 1 may be a standard laser element stimulated by any laser pumping means shown by laser pump 10, an Nd/YAG or He/Ne laser or any other laser beam source adaptable to Q-switching.

Light from the gain medium 1 and mirror 2 passes through a cylindrical lens 3. If a negative lens is employed, the light becomes divergent. A positive cylindrical lens, producing a convergent beam may also be employed but is disadvantageous because of high power densities produced by focusing.

Light from the lens 3 strikes an ultrasonic, transparent medium 4. Any of the well-known acousto-optic materials may be employed; $TeO_2$ is one preferred material because of its low velocity of ultrasonic (acoustic) wave transmission. This property makes available a wider acoustic bandwidth range.

A highly reflective surface 5 is affixed to the crystal 4 on the side opposite the impinging light rays. The mirror 5 should be parallel to the direction of propagation of the acoustic wave in the device. The simple addition of mirror 5 to crystal 4 will not work. If a mirror is placed behind a normal acoustic-optic cell, light will not be reflected back along the same path. Thus, no lasing action would occur. To function properly, the mirror has to act like it was in the middle of a divided cell. Mirror 5 must make crystal 4 appear twice as thick as it really is.

Traveling acoustic waves are generated by a transducer 6 attached to the top of the crystal 4. A standard piezoelectric or similarly responsive transducer may be employed. The transducer must be placed close to mirror 5 so that the sound waves are generated adjacent to the mirror. Transducer 6 operates in response to an electrical signal generator 7. The signal generator 7 is designed to deliver a fast rf signal pulse of a fixed amplitude but with sweep frequency generation that ranges linearly from low to high over a controlled pulse bandwidth. With a negative cylindrical lens 3, the chirp should be inverted, that is lower frequencies should be at the beginning of the pulse because the incident beam will be divergent instead of convergent. The frequencies would normally cover a bandwidth of about 22 to 40 MHz, although frequencies to 100 MHz may be available depending on the cell used. The actual ultrasonic frequencies available will depend on the medium used.

The chirped pulse causes the light incident on the crystal 4 to be diffracted in such a manner that the incident beam from lens 3 will be diffracted and reflected from mirror 5 back through lens 3, resulting in a high-Q oscillatory condition.

At a given instant in time the acoustic chirp wave is totally within the cell 4 and the incident optical wave is focused back to the back mirror 2. This is the high-Q instant; the optical wave front is totally refracted at the Bragg angle to the chirp wave. As the chirp waveform moves through the cell, the incident beam will become less focused and diffracted until it passes through the crystal 4 unhindered by the acoustic waves and is reflected by mirror 5 into an output beam. No partially transmissive element is needed to regulate the output beam.

The operation of the device is better visualized with the aid of broken lines 8 representing the diffracted beam which would emerge from crystal 4 in the absense of mirror 5 and the broken lines 9 illustrating the undiffracted output beam which would result without the mirror. Lines 8 and 9 represent the operation of previous devices; the present device, of course, utilizes the mirror image of these lines such that the apparent thickness for diffraction in the cell 4 is twice the actual thickness of the cell.

Figure 2:
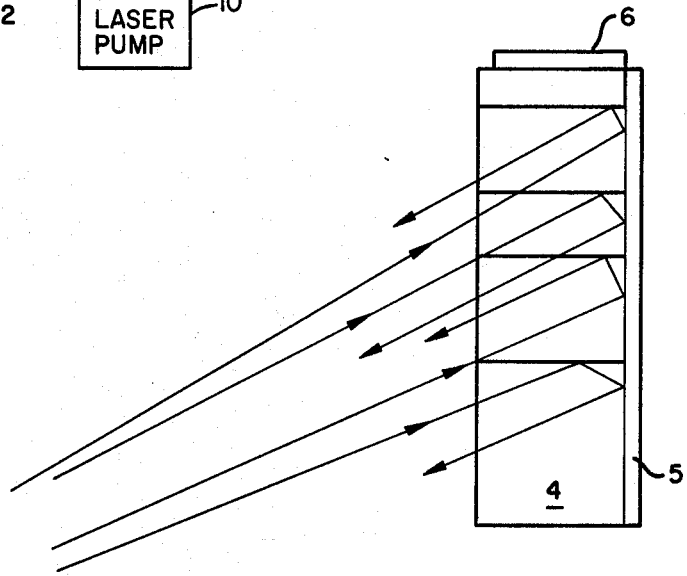
FIG. 2 is a diagrammatic representation of the diffraction of the A-O cell of the present invention.

The effectiveness of placing a planar reflective surface on the A-O material is illustrated in FIG. 2. It can be seen diagrammatically that an input beam diffracted by the chirp wave is retroflectively reflected so that the output rays are exactly parallel to the input rays. The arrangement of the present invention exploits the ability of the chirp wave to diffract light either before or after it strikes the mirror 5. Of course, undiffracted input rays are reflected from the mirror 5 in the expected manner.

This configuration is advantageous in that only one output beam is generated and is efficient in that all rays can be incident at the optimum Bragg angle and fewer components are used. The acousto-optic cell, aside from allowing faster Q-switching, requires less power, has fewer components, and increases laser power with smaller beam divergence.

Other combinations of auxilliary lenses, apertures and mirrors other than those specifically taught herein should be readily apparent in light of the above description.

What is claimed is:

1. An acousto-optic Q-switch for switching a laser beam from a laser beam source to an output from a high Q condition wherein laser energy is input along an optical path to the Q-switch and reflected back along the same optical path to its source, comprising:

a cell of acousto-optic material placed in said optical path;

a highly reflective surface disposed on said acousto-optic material so that said laser energy input passes through the acoustic-optic material to strike the reflective surface such that said cell of acousto-optical material appears to be twice its actual thickness; and means for introducing a chirped acoustic pulse to said cell, such that said acoustic pulse is adjacent to said highly reflective surface and travels parallel to said reflective surface and propagates in said cell at the Bragg angle to laser energy traveling through said cell for all portions of the chirped acoustic pulse during the high Q condition, whereby the chirped acoustic pulse diffracts the laser energy input causing the highly reflective surface to reflect the laser energy input back to its source when the chirped pulse is totally within the cell.

2. The acousto-optic Q-switch of claim 1 further comprising a negative cylindrical lens disposed along the optical path between the laser beam source and the acousto-optic Q switch.

3. The acousto-optic Q-switch of claim 1 wherein said acousto-optic material is paratellurite.

4. The acousto-optic Q-switch of claim 1 wherein said means for introducing said chirped acoustical pulses to the cell comprises an electrical transducer affixed to the cell and means coupled to the transducer for generating a chirped rf electrical pulse with a controlled bandwidth.

5. Apparatus for providing a Q-switched laser output comprising:

a laser gain medium for emitting a beam of coherent light along an optical path;

a laser pumping means attached to said gain medium for driving said gain medium;

a reflective surface for defining one end of a resonant cavity placed in the optical path of said beam from one end of said laser gain medium so as to reflect said beam back through said laser gain medium;

an acoustic-optic lens along the optical path of the beam of coherent light for producing a focused beam of coherent light;

a transducer for propagating chirped acoustic waves in said acoustic-optic lens that propagate in a direction that causes said laser beam to strike said acoustic waves at the Bragg angle in said acousto-optic lens;

means placed along the optical path between the laser gain medium and the acousto-optic lens for making the beam of coherent light divergent upon the acousto-optic lens; and a reflective coating applied to the acousto-optic lens so as to be adjacent to said acoustic waves from said transducer and parallel to the direction of propagation of said acoustic waves for reflecting the focused beam of coherent light back along the optical path from the laser gain medium.

* * * * *